(12) United States Patent
Kumar (10) Patent No.: US 9,003,700 B2
(45) Date of Patent: *Apr. 14, 2015

(54) MULTI-FUNCTIONAL FURNITURE-ACCESSORY SYSTEM

(71) Applicant: Sivathanu B. Kumar, Tampa, FL (US)

(72) Inventor: Sivathanu B. Kumar, Tampa, FL (US)

(*) Notice: Subject to any disclaimer, the term of this patent is extended or adjusted under 35 U.S.C. 154(b) by 135 days.

This patent is subject to a terminal disclaimer.

(21) Appl. No.: 13/908,527

(22) Filed: Jun. 3, 2013

(65) Prior Publication Data

US 2013/0264921 A1    Oct. 10, 2013

Related U.S. Application Data

(63) Continuation-in-part of application No. 12/928,975, filed on Dec. 23, 2010, now Pat. No. 8,453,379.

(60) Provisional application No. 61/851,607, filed on Mar. 11, 2013, provisional application No. 61/398,613, filed on Jun. 29, 2010.

(51) Int. Cl.
*A01G 9/02* (2006.01)
*A47B 85/06* (2006.01)
*A47C 13/00* (2006.01)

(52) U.S. Cl.
CPC .............. *A47B 85/06* (2013.01); *A47C 13/00* (2013.01); *A01G 9/02* (2013.01)

(58) Field of Classification Search
USPC ................... 47/39, 66.6, 86, 65.5, 17, 33
See application file for complete search history.

(56) References Cited

U.S. PATENT DOCUMENTS

| | | | | | |
|---|---|---|---|---|---|
| 127,243 | A | * | 5/1872 | Johnson | 40/407 |
| 869,523 | A | * | 10/1907 | Schmidt | 47/66.6 |
| 4,056,897 | A | * | 11/1977 | Pearce et al. | 47/39 |
| 2011/0203175 | A1 | * | 8/2011 | Horito et al. | 47/65.6 |

* cited by examiner

*Primary Examiner* — Monica Williams
*Assistant Examiner* — Magdalena Topolski (57) ABSTRACT

A central housing in a generally rectilinear configuration. The central housing has a horizontal open top, a horizontal open bottom and side walls. A horizontal lower divider panel is between the top and the bottom. Lateral openings in the housing are located in the lower section of the upstanding side walls adjacent to the bottom extent. A plurality of interchangeable upper components is chosen from the class including a cover having seat and table top on the top and bottom of the planar surfaces, an ice chest a large planter, an upper horizontal divider panel and an ice chest. The upper components are adapted to be selectively positioned on the open top and depend into the upper component. A plurality of lower components is chosen from the class including doors and casters. A lateral opening is formed in the housing adjacent to the bottom.

11 Claims, 10 Drawing Sheets

MULTI-FUNCTIONAL FURNITURE-ACCESSORY SYSTEM

RELATED APPLICATION

This application is a non-provisional based upon Provisional Application Ser. No. 61/851,607 filed Mar. 22, 2013 and is a continuation-in-part of pending application Ser. No. 12/928,975 filed Dec. 23, 2010 which is in turn based upon Provisional Application Ser. No. 61/398,613 filed Jun. 29, 2010 the subject matter of which applications is incorporated herein by reference.

BACKGROUND OF THE INVENTION

Field of the Invention

The present invention relates to a multi-functional furniture/accessory system and more particularly pertains to indoor and outdoor use and adapted to be reconfigured for a variety of capabilities and configurations, the reconfiguring being done in a safe, convenient, eye-appealing and economical manner.

SUMMARY OF THE INVENTION

In view of the disadvantages inherent in the known types of furniture systems of known designs and configurations now present in the prior art, the present invention provides an improved multi-functional furniture/accessory system. As such, the general purpose of the present invention, which will be described subsequently in greater detail, is to provide a new and improved multi-functional furniture/accessory system and method which has all the advantages of the prior art and none of the disadvantages.

To attain this, the present invention essentially comprises a multi-functional furniture/accessory system. First provided is an upper component. The upper component has a central housing. The central housing is formed in a generally rectilinear configuration. The central housing has an upper extent. The upper extent is provided in a generally square cross sectional configuration. The upper extent has a front, a back upstanding side walls. The lower middle section of the upstanding walls has slots extending and covering generally most of the lower sections of the upstanding walls.

The central housing further includes four slots. The slot is formed in the bottom central section of the upper chamber side walls. In this manner the sections of the upstanding walls 90, 92, 94 and 96 lateral to the slots connect the upper chamber to the lower chamber with a space in between. The sections of the upstanding walls 90, 92, 94 and 96 lateral to the slots couple the bottom corners of the upper chamber on the top corners of the horizontal divide panel of lower chamber.

The upper extent is of a first peripheral size. The central housing has a lower extent. The lower extent is provided in a generally square cross sectional configuration. The lower extent is of a second peripheral size. The central housing has a horizontal open top. The central housing has a horizontal bottom. The second size is greater than the first size. The central housing the central housing further includes an intermediate extent. The intermediate extent has four trapezoidal panels. In this manner the upper and lower extents are coupled. The central housing further includes a slot. The slot is formed in the lower extent. The slot covers at least the entire one side of the lower extent. The slot has a door 81 spanning the entire opening in this manner the passage of components into the lower chamber of the central housing for storage purposes is allowed. Further in this manner the passage of components from the central housing for utilization purposes is allowed. The central housing has a horizontal divide panel. The divide panel is provided between the top and the bottom. In this manner an upper extent and a lower chamber are provided.

A lower component has a base. The base has four corner casters. The casters depend from the base for transportation purposes. The base has a periphery. The periphery of the base is essentially equal to the periphery of the lower extent. Pluralities of interchangeable upper components are provided. Each of the upper components has generally a square upper peripheral size. The peripheral size of each upper component is greater than the peripheral size of the open top of the central housing.

The upper components include a cover and seat. The cover and seat is provided in a generally rectilinear configuration. The cover has an upper seat and lower table top section. The upper and lower sections are removably receivable within the top of the central housing. The upper seat section of the cover has an enlarged upper resilient section. In this manner a seat and table top are provided for a user of the system. The upper resilient section is supported by the top. In this manner a covering is provided for the system. The cover and seat has peripheral channels. The peripheral channels are provided in the top and bottom sections of the periphery of the cover. In this manner rain water is directed away from the system. Further in this manner the system is maintained dry when exposed to rain. The upper components include an upper horizontal divide panel 80. The upper divide panel 80 is provided between the upper chamber and the open space 99. In this manner an open is provided between the upper chamber and the lower chamber and in the central housing.

The upper horizontal divide panel is provided in a generally rectilinear configuration. The s upper horizontal divide panel is removably receivable within the top of the central housing. In this manner a seat is provided for a user of the system.

The upper components also include a small utility tray. The small planer is provided in a generally rectilinear configuration. The small planter has a lower section. The small planter is removably receivable within a minority of the extent of the upper chamber of the central housing. The small planer has a depth. In this manner the small planter receives items. The small planter has an enlarged upper section. The upper section is supported by the top.

The upper components further include a large planter. A large planter is provided in a generally rectilinear configuration. The large planter has a lower section. The lower section is removably receivable within a majority of the extent of the upper chamber of the central housing. The large planter has a depth. The large planter has drainage outlet 70. In this manner the large planer receives and supports soil and foliage. The large planter has an enlarged upper section. The upper section is supported by the top.

The upper components further include a large ice chest. The ice chest is provided in a generally rectilinear configuration. The ice chest has a lower section. The lower section is removably receivable within a majority of the extent of the upper chamber of the central housing. The ice chest has a depth. The ice chest has drainage outlet 72. The drainage outlet 72 has an open and close valve. In this manner the ice chest receives ice and other items. The ice chest has an enlarged upper section. The upper section is supported by the top.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multi-functional furniture/accessory system which has all of the advantages of the prior art furniture systems of known designs and configurations and none of the disadvantages.

It is another object of the present invention to provide a new and improved multi-functional furniture/accessory system which may be easily and efficiently manufactured and marketed.

It is further object of the present invention to provide a new and improved multi-functional furniture/accessory system which is of durable and reliable constructions.

An even further object of the present invention is to provide a new and improved multi-functional furniture/accessory system which is susceptible of a low cost of manufacture with regard to both materials and labor, and which accordingly is then susceptible of low prices of sale to the consuming public, thereby making such multi-functional furniture/accessory system economically available to the buying public.

Even still another object of the present invention is to provide a multi-functional furniture/accessory system for indoor and outdoor use and adapted to be reconfigured for a variety of capabilities and configurations, the reconfiguring being done in a safe, convenient, eye-appealing and economical manner.

Lastly, it is an object of the present invention to provide a new and improved multi-functional furniture/accessory system. A central housing is provided in a generally rectilinear configuration. The central housing has a horizontal open top, a horizontal open bottom and side walls. The central sections of the side walls of the central housing have slots, opening laterally. A horizontal divider panel is provided between the top extent and the bottom extent. A plurality of interchangeable upper component is chosen from the class of upper components. The class of upper components includes a cover and seat combination, a small planter, a large planter and large ice chest. The upper components are adapted to be selectively positioned on the open top and depend into the upper component. A plurality of lower components is chosen from the class of lower components. The class of lower components includes casters and a door. A lateral opening in the housing is provided adjacent to the bottom for storage of selected upper components.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

With reference now to the drawings, an embodiment without side openings, and in particular to FIGS. 1-5 thereof, the preferred embodiment of the new and improved multi-functional furniture/accessory system embodying the principles and concepts of the present invention and generally designated by the reference numeral 10 will be described.

The present invention, the multi-functional furniture/accessory system 10 is comprised of a plurality of components. Such components in their broadest context include a central housing, a plurality of interchangeable upper components and a plurality of lower components. Such components are individually configured and correlated with respect to each other so as to attain the desired objective.

First provided is an upper component. The upper component has a central housing 14. The central housing is formed in a generally rectilinear configuration. The central housing has an upper extent 16. The upper extent is provided in a square cross sectional configuration. The upper extent is of a first peripheral size. The central housing has a lower extent 18. The lower extent is provided in a square cross sectional configuration. The lower extent is of a second peripheral size. The central housing has a horizontal open top. The central housing has a horizontal bottom. The second size is greater than the first size. The central housing further includes an intermediate extent 20. The intermediate extent has four trapezoidal panels. In this manner the upper and lower extents are coupled. The central housing further includes a slot 22. The slot is formed in the lower extent. In this manner the passage of components into the lower chamber of the central housing for storage purposes is allowed. Further in this manner the passage of components from the central housing for utilization purposes is allowed. The central housing has a horizontal divider panel 24. The divide panel is provided between the top and the bottom. In this manner an upper chamber and a lower chamber are provided.

The bottom of the lower chamber has four corner casters 30 for transportation purposes. The casters depend from the bottom of the lower chamber. Pluralities of interchangeable upper components are provided. Each of the upper components has a square upper peripheral size. The peripheral size of each upper component is greater than the peripheral size of the open top of the central housing.

Figure 1:
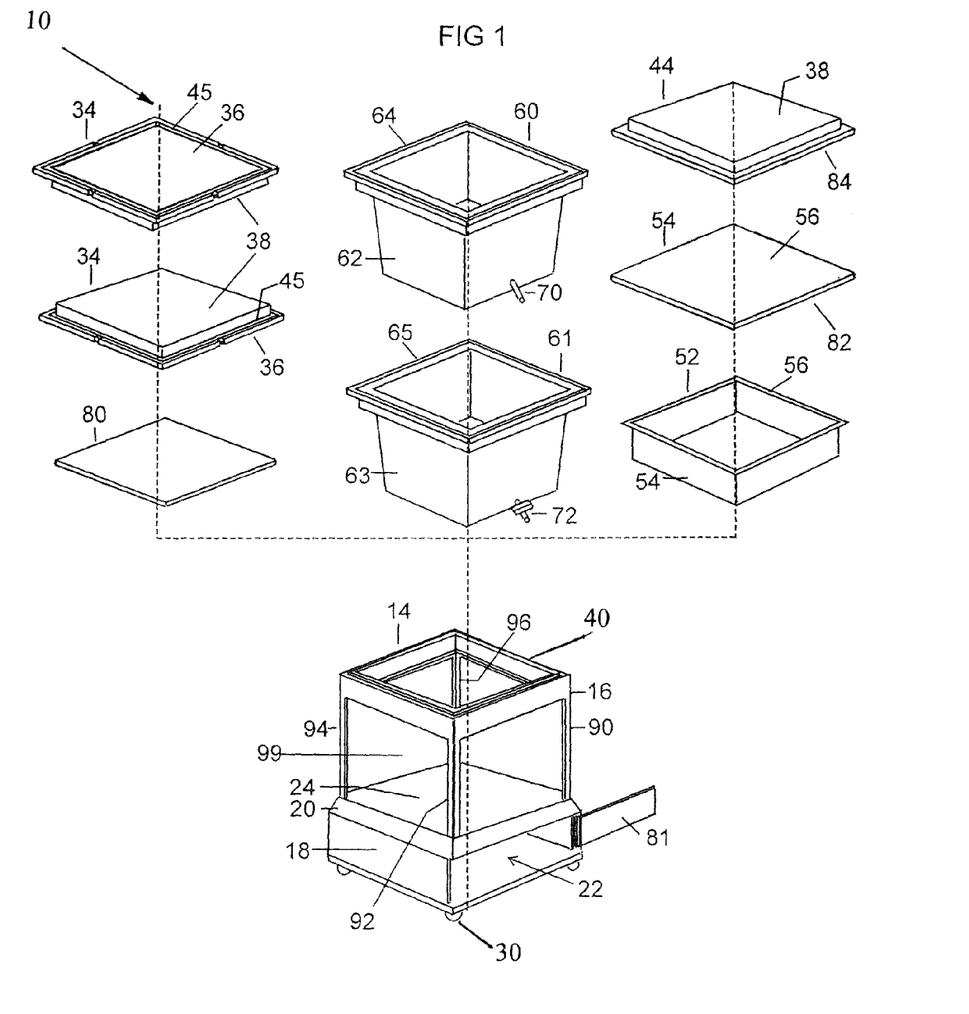
FIG. 1 is an exploded perspective illustration of an outdoor multi-functional furniture-accessory system with a variety of capabilities and configurations, constructed in accordance with the principles of the present invention.
Figure 1A:
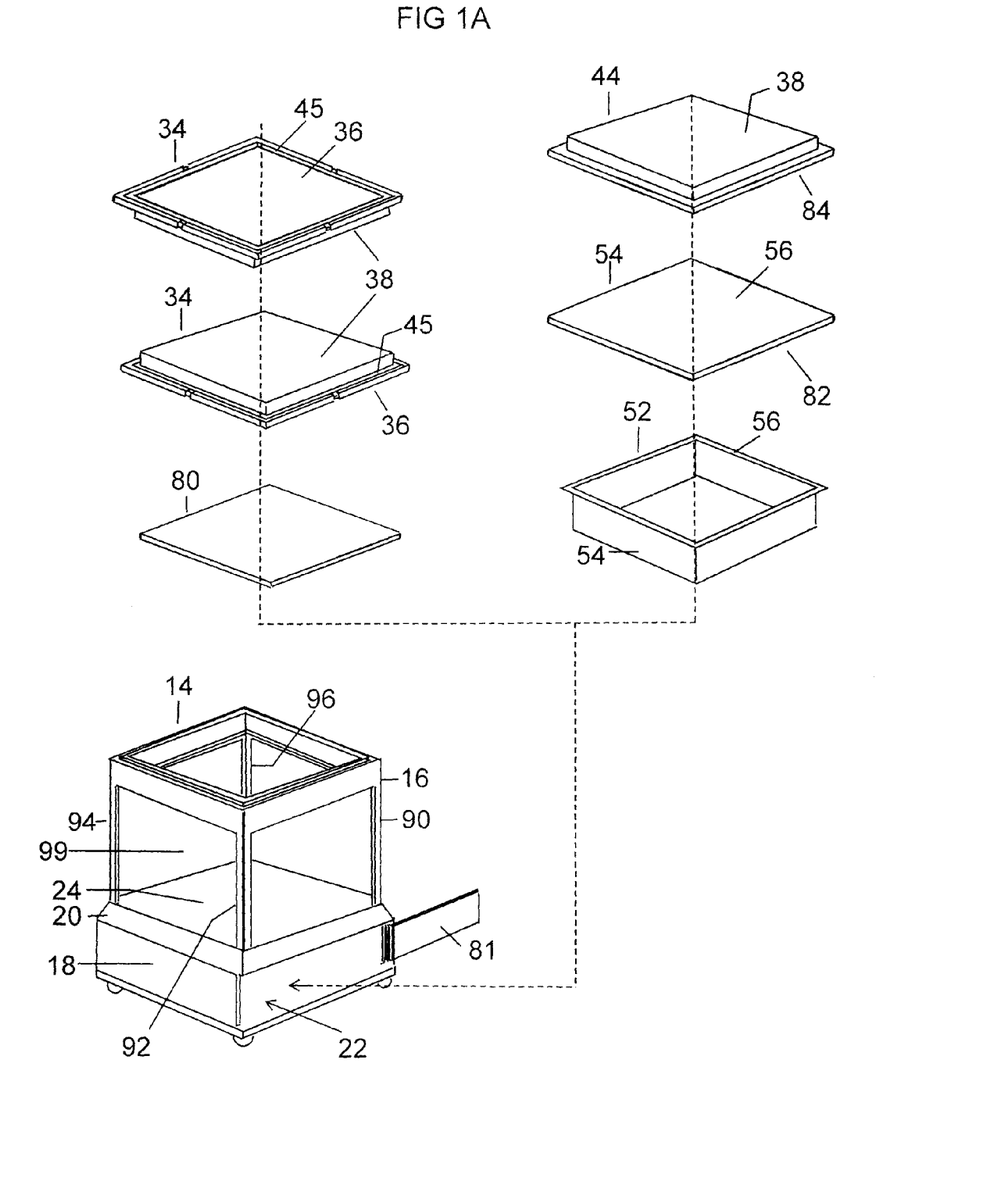
FIGS. 1A and 1B illustrate the system with components in various repositionings.
Figure 1B:
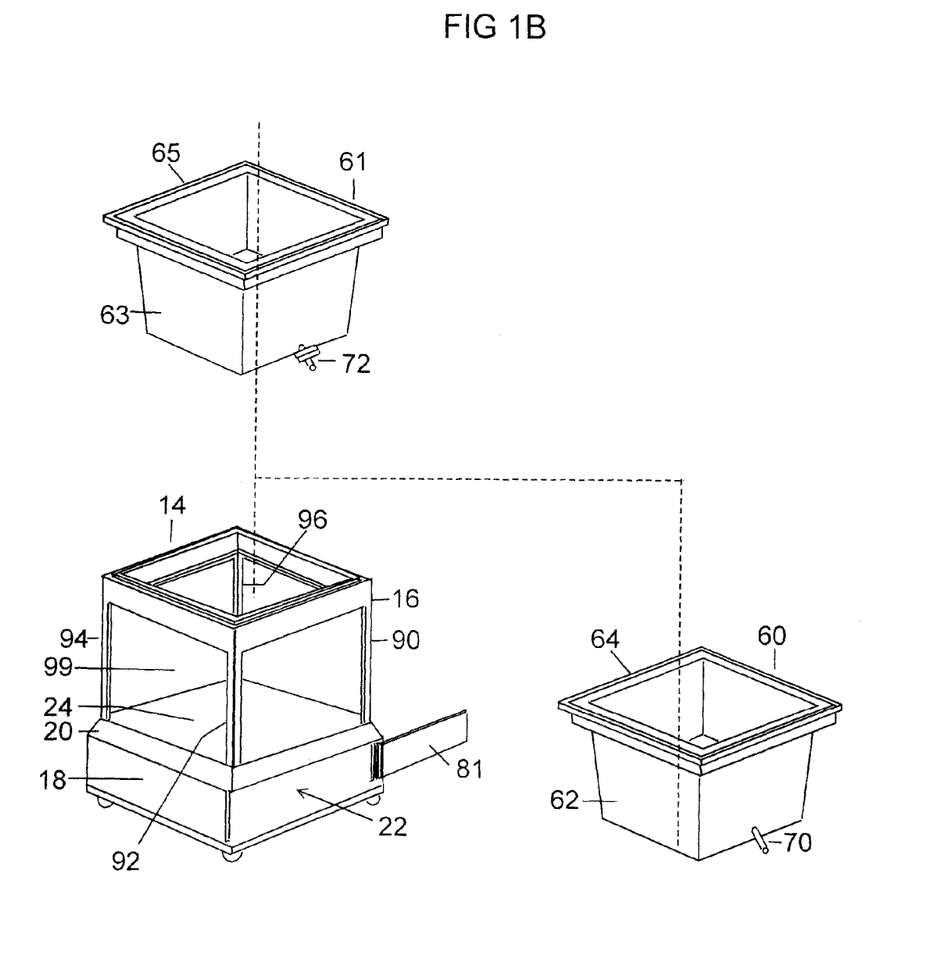
Figure 2:
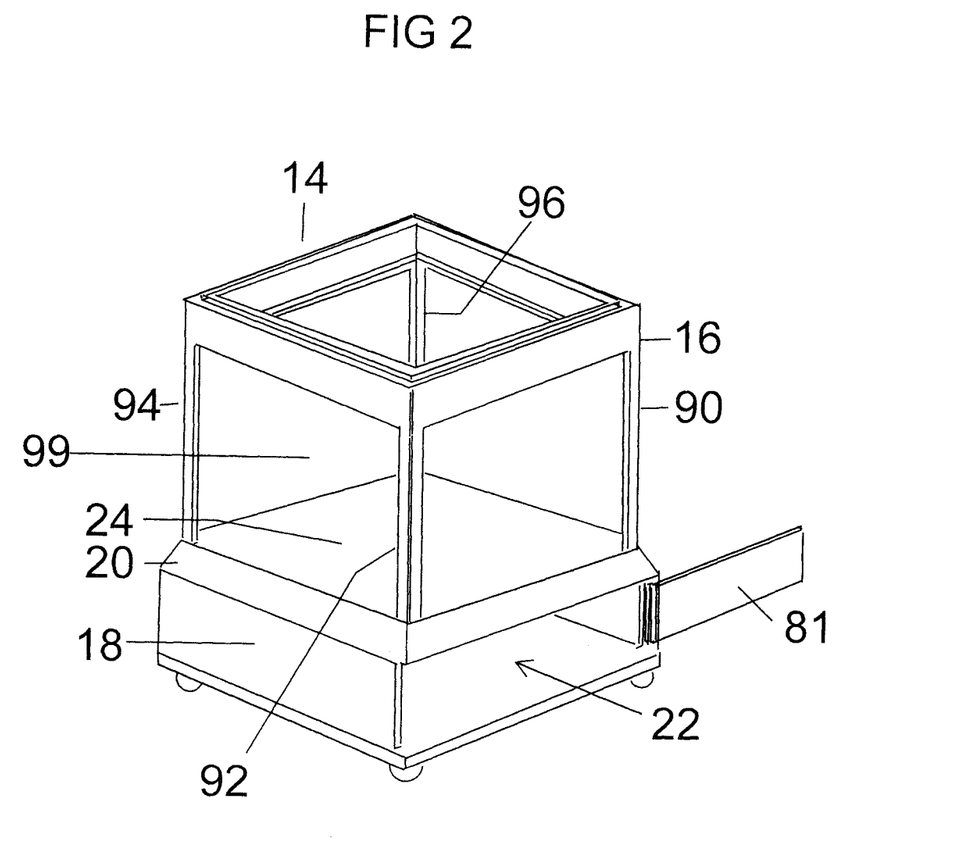
FIG. 2 is a perspective illustration of the system shown in FIG. 1 but in a non-exploded orientation without upper components.
Figure 3:
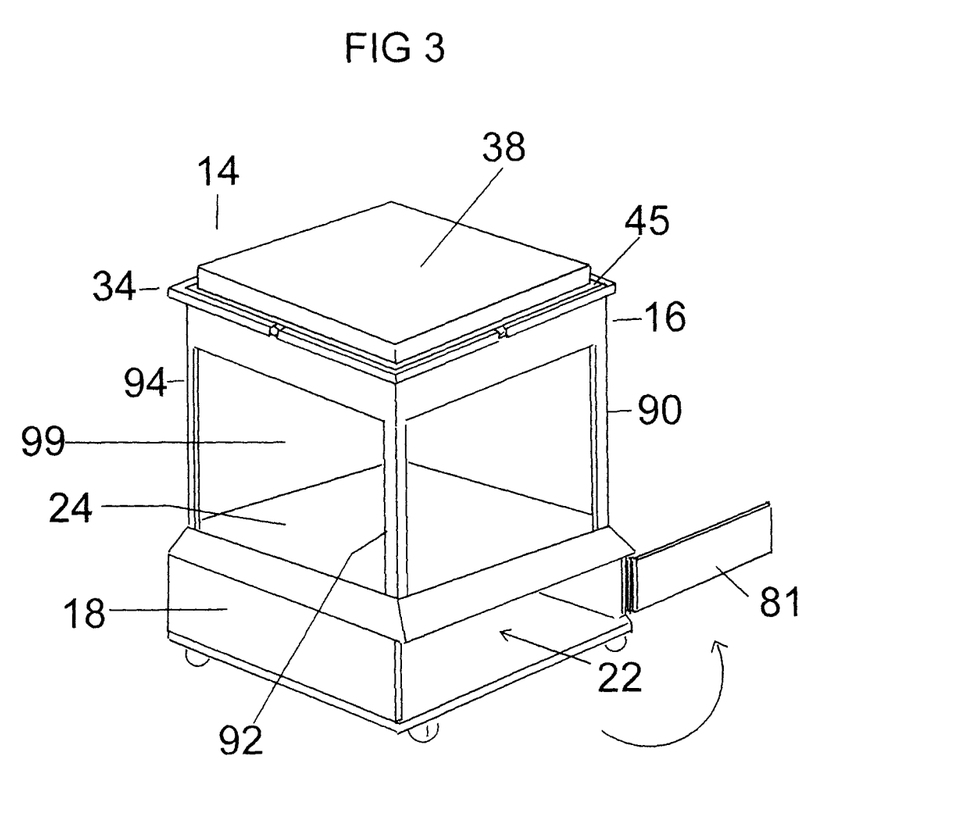
FIG. 3 is a perspective illustration of the system shown in FIG. 1 but in a non-exploded orientation with seat component.
Figure 4:
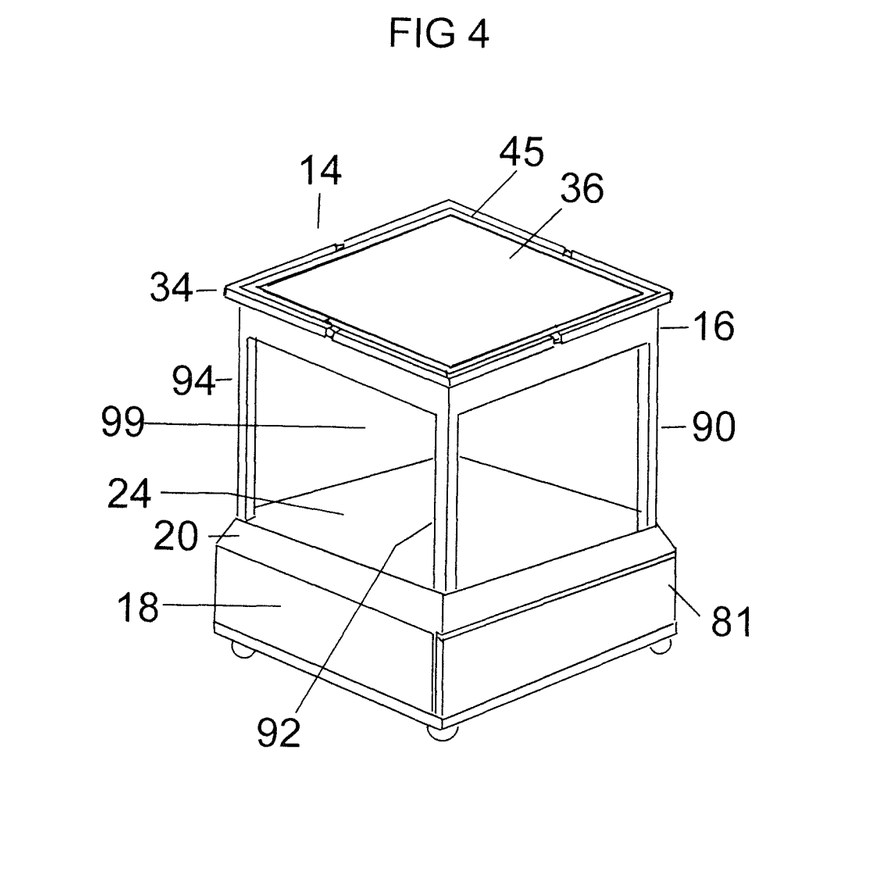
FIG. 4 is a perspective illustration of the system in FIG. 1 but in a non-exploded orientation having table top component.
Figure 5:
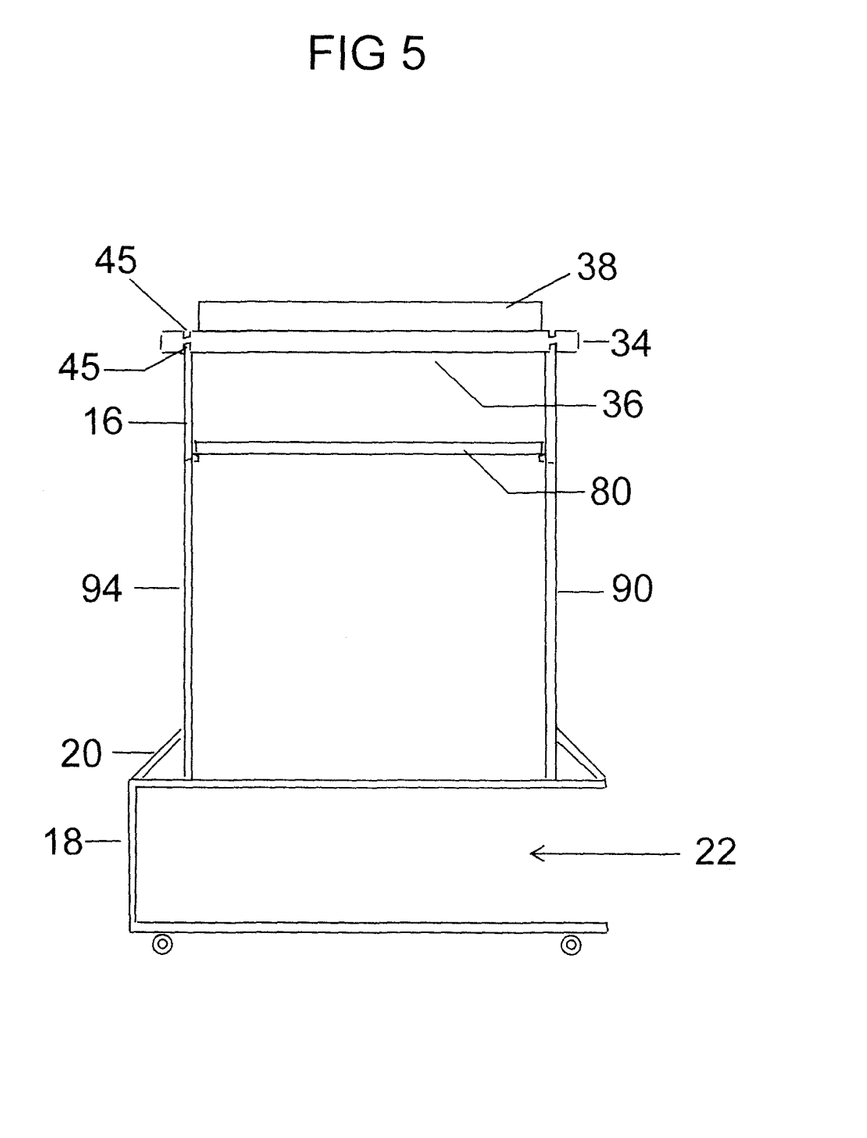
FIG. 5 is cross sectional view similar to FIGS. 2 3 and 4 but illustrating the indoor and outdoor embodiment shown in FIGS. 2 3 and 4.
Figure 5A:
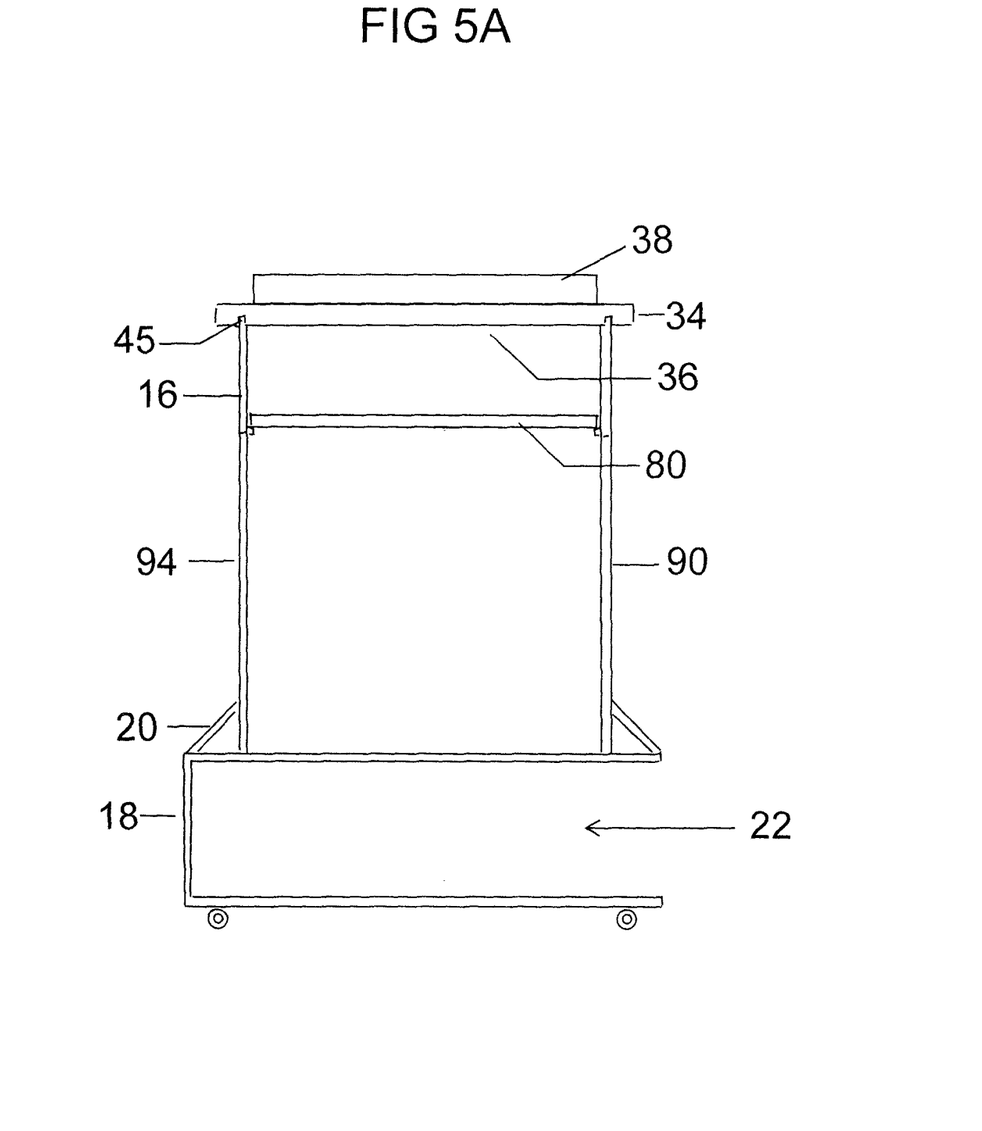
FIGS. 5A and 5B illustrate additional features and capabilities of the invention.
Figure 5B:
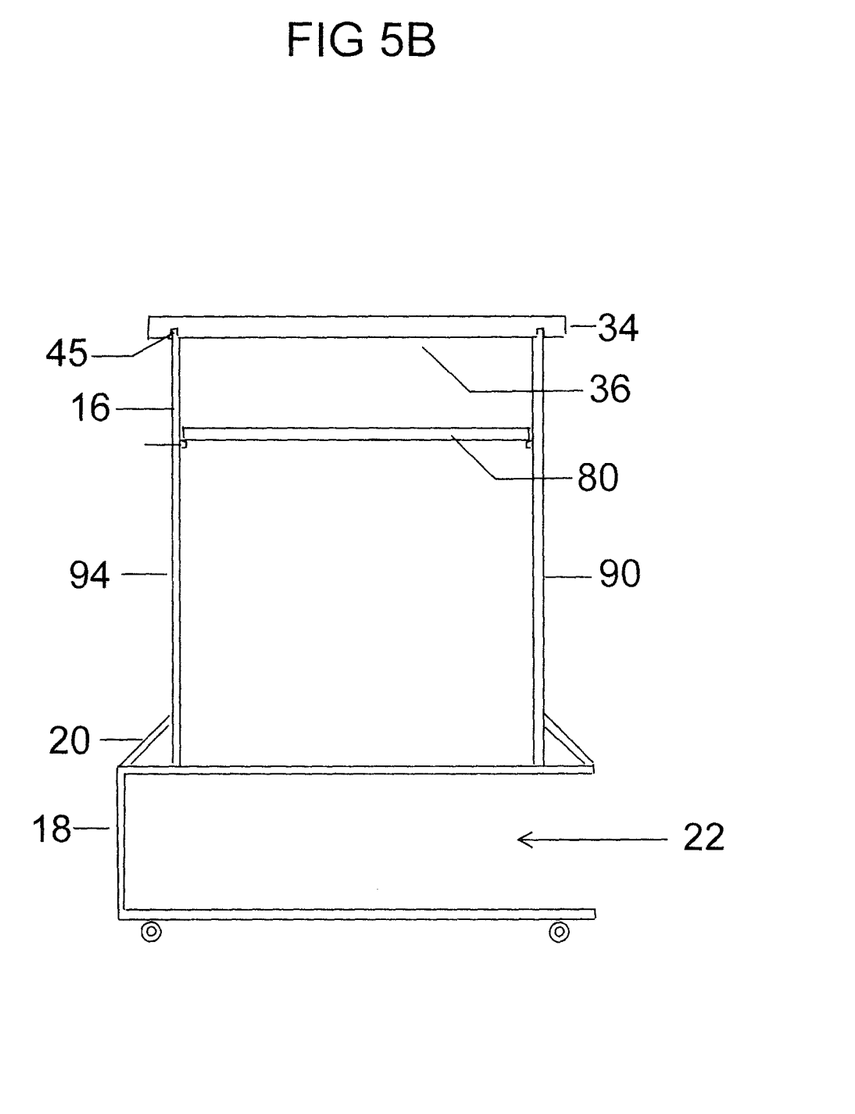
Figure 6:
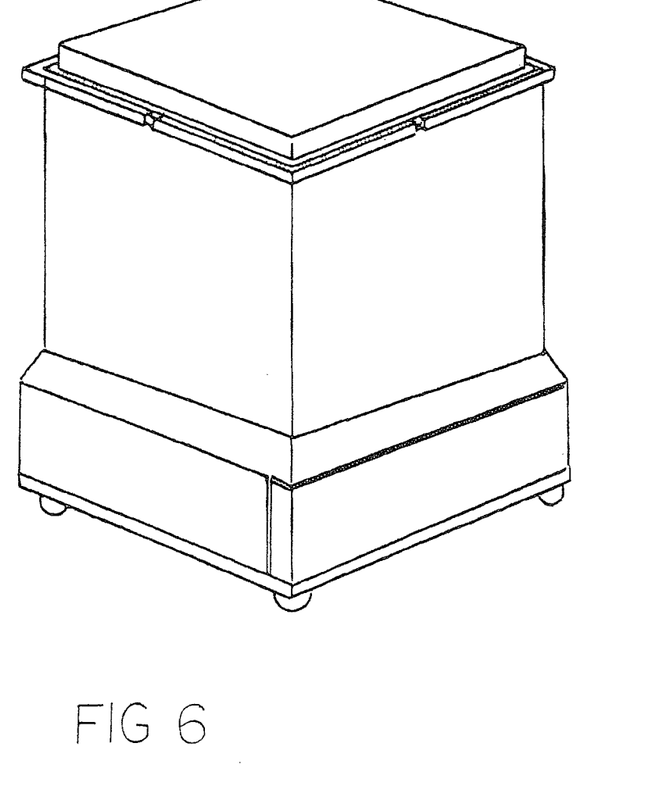
FIG. 6 is a perspective illustration of a system constructed in accordance with an earlier embodiment of the invention.

The upper components include a cover component. The cover component further has a seat 34 component and a table top component. The cover and seat is provided in a generally rectilinear configuration. The cover and seat has an upper section 38 and lower section 36. The upper section 38 and lower section 36 are removably receivable within the top of the central housing. The upper section 38 of cover and seat 34 has an enlarged upper resilient seat section 38. The upper resilient seat section is supported by the top. In this manner a covering is provided for the system.

The cover has peripheral channels 45. The peripheral channels are provided within the periphery of the cover and seat component. The top edges of the upstanding walls of the central housing is adapted to engage the peripheral channels 45 and removably couple with the peripheral channels of the upper seat section 38 and lower table top section 36 of the cover component and the peripheral channels further having lateral peripheral channels 40.

The cover has peripheral lateral channels 40. The peripheral channels are provided in the periphery of the cover and seat component. In this manner rain water and liquids are directed away from the system. Further in this manner the system is maintained dry when exposed to rain.

The upper components include a seat member 44. The seat member 44 further has enlarged upper resilient seat component 38. The seat member 44 is provided in a generally rectilinear configuration.

The seat member 44 has an upper section 38 and lower section 84. The lower section 84 has cannels and indentations for removably receiving on the upper extent 16 of the central housing. The upper resilient seat component 38 is supported by the upper extent 16 of the central housing. The top edges of the upstanding walls of the upper extent 16 of the central housing are adapted to engage the cannels and indentations and removably couple with the seat member 44.

The upper components include a table top member 54. The table top member 54 is provided in a generally rectilinear configuration. The table top member 54 has an upper section 56 and lower section 82. The lower section 82 has cannels and indentations for removably receiving on the upper extent 16 of the central housing. The table top member 54 is supported by the upper extent 16 of the central housing. The top edges of the upstanding walls of the upper extent 16 of the central housing are adapted to engage the cannels and indentations and removably couple with the table top member 54.

The upper components also include a small utility tray 52. The small planer is provided in a generally rectilinear configuration. The small utility tray has a lower section 54. The small utility tray is removably receivable within a minority of the extent of the upper chamber of the central housing. The small planer has a depth. In this manner the small utility tray receives and supports soil and foliage. The small utility tray has an enlarged upper section 56. The upper section is supported by the top.

The upper components further include a large planter 60. A large planter is provided in a generally rectilinear configuration. The large planter has a lower section 62. The lower section is removably receivable within a majority of the extent of the upper chamber of the central housing. The large planter has a depth. In this manner the large planer receives and supports soil and foliage. The large planter has an enlarged upper section 64. The upper section is supported by the top.

The upper components further include a large ice chest 61. A large ice chest is provided in a generally rectilinear configuration. The large ice chest has a lower section 63. The lower section is removably receivable within a majority of the extent of the upper chamber of the central housing. The large ice chest has a depth. In this manner the large planer receives and supports soil and foliage. The large ice chest has an enlarged upper section 65. The upper section is supported by the top.

With reference now to the drawings illustrating the preferred embodiment with open sides, and in particular to FIGS. 1 through 5 thereof, the preferred embodiment of the new and improved multi-functional furniture/accessory system embodying the principles and concepts of the present invention and generally designated by the reference numeral 10 will be describe The present invention, the multi-functional furniture/accessory system 10 is comprised of a plurality of components. Such components in their broadest context include a central housing, a plurality of interchangeable upper components and a plurality of lower components. Such components are individually configured and correlated with respect to each other so as to attain the desired objective.

First provided is an upper component. The upper component has a central housing 14. The central housing is formed in a generally rectilinear configuration. The central housing has an upper extent 16. The upper extent is provided in a square cross sectional configuration. The upper extent is of a first peripheral size. The upper extent has upstanding side walls. The lower middle section of the upstanding side walls has slots extending and opening generally most of the lower sections of the upstanding walls. In this manner an open space is provided between the lower extent and the upper chamber. The upstanding side walls of the upper section above the slots of the forms the upper chamber. In this manner an open space is provided between the lower extent and the upper chamber The sections of the upstanding wall of the upper extent, lateral to the slots extends between the top corners of the periphery of the horizontal divide panel to the top corners of the horizontal bottom periphery of the upper chamber.

The upper chamber and the lower extent are separated by a space. Plurality of liner projections extend between the top corners of the periphery of the horizontal divide panel to the top corners of the horizontal bottom periphery of the upper chamber. In this manner an upper chamber and a lower chamber are provided with a space of generally half of the overall height of the entire central housing between the upper chamber and a lower chamber. In this manner the upper and lower extents are coupled.

The central housing has a lower extent 18. The lower extent is provided in a square cross sectional configuration. The lower extent is of a second peripheral size. The central housing has a horizontal open top. The central housing has a horizontal open bottom. The second size is greater than the first size. The central housing further includes an intermediate extent 20. The intermediate extent has four trapezoidal panels. The upper and lower extents are coupled. The central housing further includes a slot 22. The slot is formed in the lower extent. In this manner the passage of components into the lower chamber of the central housing for storage purposes is allowed. Further in this manner the passage of components from the central housing for utilization purposes is allowed. The central housing has a horizontal divider panel 24. The divider panel is provided between the top and the bottom. In this manner an upper chamber and a lower chamber are provided.

The bottom of the lower chamber has four corner casters 30 for transportation purposes. The casters depend from the bottom of the lower chamber. The base has a periphery. The periphery of the base is essentially equal to the periphery of the lower extent. In this manner the base may be received by the lower extent of the central housing for transportation purposes.

Pluralities of interchangeable upper components are provided. Each of the upper components has a square upper peripheral size. The peripheral size of each upper component is greater than the peripheral size of the open top of the central housing.

The upper components include a cover component. The cover component further has a seat 34 component and a table top component. The upper components include a cover and seat 34 component. The cover and seat is provided in a generally rectilinear configuration. The cover and seat has an upper section 38 and lower section 36. The upper section 38 and lower section 36 are removably receivable within the top of the central housing. The upper section 38 of cover and seat 34 has an enlarged thin upper resilient seat section 38. The upper resilient seat section is supported by the top. In this manner a covering is provided for the system. The cover has peripheral channels 45. The peripheral channels are provided in the periphery of the cover and seat component. In this manner rain water and liquids are directed away from the system. Further in this manner the system is maintained dry when exposed to rain.

The upper components include a seat 44. The seat is provided in a generally rectilinear configuration. The seat has a lower section. The seat is removably receivable within the top of the central housing. The seat has an enlarged thick upper resilient section. The upper resilient section is supported by the top. In this manner a seat is provided for a user of the system.

The upper components also include a small utility tray 52 as above described.

The upper components further include a large planter 60 as above described.

The upper components further include a large ice chest 61 as above described.

The upper components further include a planar horizontal upper divide panel. The peripheral size of the horizontal top opening of the central housing is greater than the peripheral size of the horizontal upper divide panel. The horizontal divide panel is removably receivable within a minority of the extent of the upper chamber of the central housing. The top section of the upstanding walls of upper extent above the top periphery of the slots has inwardly projecting stopper members for securing the horizontal divide panel. The horizontal divide panel is provided between the top and the bottom of the upper chamber (upper extent.

The upstanding wall has slots extending and covering generally most of the lower sections of the upstanding walls of upper extent. The lateral sections of slots/openings of the upstanding wall of the upper chamber, upper extent, forming the legs. The upper components include an upper horizontal divide panel 80. The upper divide panel 80 is provided between the upper chamber and the open space 99. In this manner an open space is provided between the upper chamber and the lower chamber and in the central housing.

The various upper components are adapted to be used and/or stored upon the upper section of the housing and within the lower section of the housing in any of a wide variety of orientations and locations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-functional furniture/accessory kit comprising:
    a central housing formed in a generally rectilinear configuration with a horizontal open top and a horizontal open bottom and with side walls, the central housing having a horizontal lower divider panel between the top and the bottom defining an upper chamber there above and a lower chamber there below;
    a plurality of interchangeable upper components comprising including a combination cover and seat, a seat member, table top member, a small utility tray, a large planter, an ice chest and a horizontal upper divider panel, the upper components adapted to be selectively positioned on the open top and depending into the upper chamber;
    a plurality of lower components comprising including a door and casters; and
    a lateral opening in the lower chamber adjacent to the bottom for storage of selected upper components.

2. The kit as set forth in claim 1 wherein the central housing has a common cross sectional configuration of a first size along a majority of its elevational extent and a common cross sectional configuration of a second size, greater than the first size there beneath.

3. The kit as set forth in claim 1 wherein the central housing has a generally open space located above the lower chamber, the system further including:
    a plurality of linear projections extending between and coupling the horizontal lower divide panel and the upper chamber;
    a lower middle section with upstanding walls adjacent to the lower chamber with slots in a majority of the lower middle section and thus having the majority of the lower middle section adjacent to the upper chamber with openings being above the lower chamber;
    a lateral opening in the central housing at the lower chamber;
    the upper chamber being formed by the sections of the upstanding side walls adjacent to the lateral opening;

lateral slots providing the generally open space between the upper horizontal divider panel and the horizontal lower divided panel.

4. The kit as set forth in claim 1 wherein the combination cover and seat has a seat component and a table top component, the cover component being in a generally rectilinear configuration and having peripheral channels formed in upper and lower sections of the combination cover and seat, the cover component also having lateral channels, the table top component and seat component being in a generally rotatable 180 degrees in a horizontal orientation thus the channel in the seat section and the table top section are adapted to removably couple with the central housing, and the combination cover and seat further having a table top section and a seat section, the table top section and the seat section removably receivable within the top of the central housing, the upper seat section having an enlarged upper resilient seat member supported by the top, the lower table top section and the upper seat section further providing a covering for the system and in this manner a seat and table top are available for a user of the system.

5. The kit as set forth in claim 4 wherein the lateral channels are formed in the combination cover and seat for directing rain water and liquids away from the system to maintain the system dry.

6. The kit as set forth in claim 1 wherein the upper components includes the horizontal upper divider panel in a generally rectilinear configuration removably receivable within the top of the central housing, the horizontal upper divider panel being located between the top and the lower divider, thus generally an opening of the majority of the lower central section of the side walls creating a generally open space between the upper chamber and the lower chamber.

7. The kit as set forth in claim 1 wherein the small utility tray is in a generally rectilinear configuration having a lower section removably receivable within a minority of the extent of the upper chamber, the small utility tray having a depth to receive household items, the small utility tray having an enlarged upper section supported by the top.

8. The kit as set forth in claim 1 wherein the large planter in a generally rectilinear configuration having a lower section removably receivable within the upper chamber, the large planter having a depth to receive and support soil and foliage, the large planter having an enlarged upper section supported by the top, and a drain outlet adapted for draining water.

9. The kit as set forth in claim 1 wherein the ice chest is in a generally rectilinear configuration having a lower section removably receivable within the upper chamber, the ice chest having a depth to receive and support food and drink, the ice chest having an enlarged upper section supported by the top and a drain outlet with open and close valves for draining items such as water.

10. The kit as set forth in claim 1 wherein the central housing has upstanding walls with top edges adapted to optionally engage and removably couple with the combination cover and seat and the table top section the seat member and the table top member.

11. A multi-functional furniture/accessory system (10) principally for indoor and outdoor use and adapted to be reconfigured for a variety of capabilities and configurations, the reconfiguring being done in a safe, convenient, eye-appealing and economical manner, the system comprising, in combination:

an upper component formed of a central housing (14) in a generally rectilinear configuration having an upper extent (16) with a square cross sectional configuration of a first peripheral size and a lower extent (18) with a square cross sectional configuration of a second peripheral size, the central housing having a horizontal open top and a horizontal open bottom, the second size being greater than the first size, the central housing further including an intermediate extent (20) formed of four trapezoidal panels coupling the upper and lower extents, the central housing further including a slot (22) formed in the lower extent for the passage of components into the lower chamber of the central housing for storage purposes and for the passage of components from the central housing for utilization purposes, the central housing having a horizontal lower divider panel (24) between the top and the bottom thereby forming an upper chamber and a lower chamber;

a lower component formed as a base with four corner casters (30) depending from the base, the base having a periphery essentially equal to the periphery of the lower extent for being removably receivable by the lower extent of the central housing for transportation purposes; and a plurality of interchangeable upper components, each of the upper components having a square upper peripheral size greater than the peripheral size of the open top of the central housing, the upper components including:

a cover (34) in a generally rectilinear configuration having a lower table top section (36) removably receivable within the top of the central housing and with an enlarged upper resilient seat section (38) supported by the top and providing a covering for the system, peripheral channels (45) in the upper seat section (38) and peripheral channels (45) in the lower table top section (36) of the cover component, the central housing having upstanding walls with top edges engaging the peripheral channels (45) and removably coupled optionally with the peripheral channels of the upper seat section (38) and the lower table top section (36) of the cover component and the peripheral;

lateral channels (40) formed in the periphery of the cover for directing rain water away from the system to maintain the system dry when exposed to rain;

a seat (44) in a generally rectilinear configuration having a lower section removably receivable within the top of the central housing and with an enlarged thick upper resilient section supported by the top and providing a seat for a user of the system;

a small planter (52) in a generally rectilinear configuration having an lower section (54) removably receivable within a minority of the extent of the upper chamber of the central housing with a depth to receive and support soil and foliage, the small planter having an enlarged upper section (56) supported by the top; and a large planter (60) in a generally rectilinear configuration having a lower section (62) removably receivable within a majority of the extent of the upper chamber of the central housing with a depth to receive and support soil and foliage, the large planter having an enlarged upper section (64) supported by the top.

* * * * *